(No Model.)  
N. SMITH.  
WAGON JACK.  
2 Sheets—Sheet 1.
No. 293,806. Patented Feb. 19, 1884.
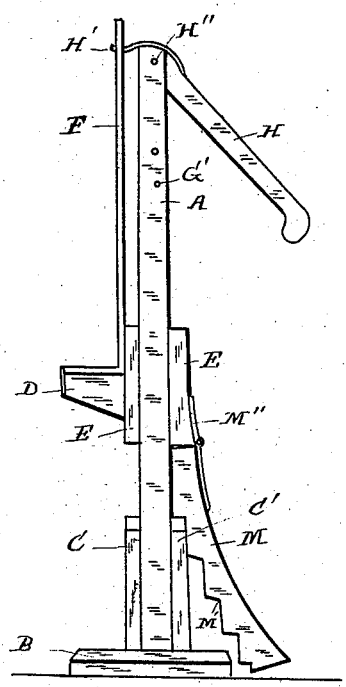
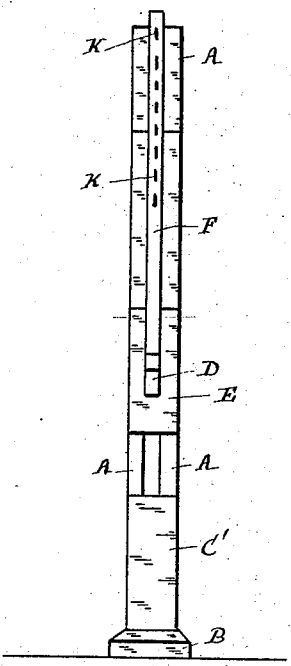
WITNESSES  
Morton Toulmin  
G. E. Olds.
INVENTOR  
Nicholas Smith  
E. H. Gelston,  
Attorney

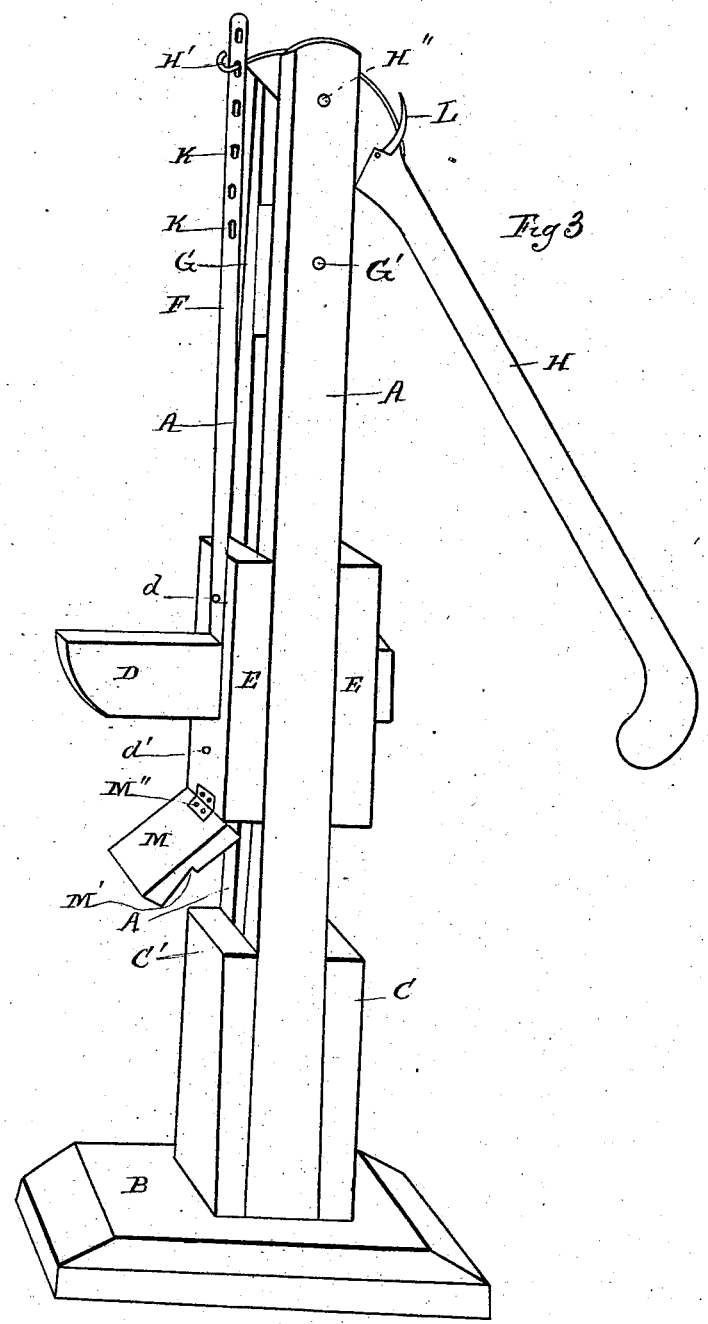

UNITED STATES PATENT OFFICE.

NICHOLAS SMITH, OF PERRY, NEW YORK.

WAGON-JACK.

SPECIFICATION forming part of Letters Patent No. 293,806, dated February 19, 1884.

Application filed March 19, 1883. (No model.)

*To all whom it may concern:*

Be it known that I, NICHOLAS SMITH, a citizen of the United States, residing at Perry, in the county of Wyoming and State of New York, have invented certain new and useful Improvements in Wagon-Jacks, of which the following is a specification, reference being had therein to the accompanying drawings.

This invention relates to improvements in wagon-jacks, and has for its object to raise wagons or other wheeled vehicles and hold them up while one or more of the wheels are being removed and until they can be replaced. These objects are attained by the mechanism illustrated in the accompanying drawings, forming a part of this specification, in which—

Figure 1 is a side elevation. Fig. 2 is a front view. Fig. 3 is a perspective view.

The letter A indicates two perpendicular standards, preferably of hard wood, placed about one inch apart, and secured in any convenient manner to a base-piece, B, of hard wood, which I prefer to make about five by ten inches, and of rectangular shape.

C C' are two pieces of hard wood, the lower ends of which rest upon the base-piece B, and are fastened to the uprights A by nails or otherwise, and act as braces to keep the uprights A more firmly in place.

D is a piece of hard wood extending through the opening between the standards A and through the pieces E, which are provided with mortises for that purpose, and which are held in place by the bolts *d d'*. The two pieces E, held together in the above-described manner, form a slide, and the piece D a rest for the axle of the vehicle, by means of which, when power is applied to the lever H, the lifting is done.

Attached to the slide E and rest D is an iron strap or band, F, having its upper end perforated with two or more slots, K, adapted to slip over the hook H' on the end of the lever H, by means of which the slide E and rest D are raised or lowered.

G is a block set between the standards A, to keep them the proper distance apart, and is secured therein by the bolt G' or other suitable means.

H is the lifting-lever, which is penetrated and held in place by the bolt H", upon which it turns.

M is a follower-block, situated on the side opposite lever H, and having one or more notches, M', which engage with the top of brace C'. This block is secured to the bottom of the slide E by a suitable hinge, M", the object being to hold the slide E and axle-rest D to the height to which they have been raised by means of the lever H, particularly on soft ground, where the sinking of the base B necessitates more than one movement of the lever H to raise the axle to the desired height.

Having described my invention, what I desire to secure by Letters Patent and to claim is—

1. In a wagon-jack, the combination of slide E, having axle-rest D, with the follower-block M, as described, and for the purposes set forth.

2. In a wagon-jack, the standards A, base B, braces C C', block G, slide E, having axle-rest D, follower-block M, and strap F, having slots K, in combination with lever H, having hook H', as described, and for the purposes set forth.

In testimony whereof I affix my signature in presence of two witnesses.

NICHOLAS SMITH.

Witnesses:
   A. L. AIMÉ,
   WM. TALLMAN.